United States Patent
Fukuda

(10) Patent No.: US 7,097,295 B1
(45) Date of Patent: Aug. 29, 2006

(54) RECORDING LIQUID FOR INK PRINTERS AND METHOD FOR RECORDING IMAGES

(75) Inventor: Yuzuru Fukuda, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/604,002

(22) Filed: Jun. 26, 2000

(30) Foreign Application Priority Data

Sep. 10, 1999  (JP)  ................................. 11-256916

(51) Int. Cl.
*G01D 11/00* (2006.01)

(52) U.S. Cl. ........................... 347/100; 347/95; 347/96

(58) Field of Classification Search ............... 347/100, 347/16, 95, 105, 96; 106/31.27, 31.6, 31.13
See application file for complete search history.

(56) References Cited

U.S. PATENT DOCUMENTS

| | | | | |
|---|---|---|---|---|
| 3,925,096 A | * | 12/1975 | Karkov | 106/309 |
| 5,135,569 A | * | 8/1992 | Mathias | 106/31.32 |
| 5,962,552 A | * | 10/1999 | Mikami et al. | 523/161 |
| 5,968,244 A | * | 10/1999 | Ueda et al. | 106/31.86 |
| 6,086,197 A | * | 7/2000 | Kubota et al. | 347/96 |
| 6,234,601 B1 | * | 5/2001 | Hayashi et al. | 347/16 |
| 6,348,519 B1 | * | 2/2002 | Ohshima et al. | 523/161 |

FOREIGN PATENT DOCUMENTS

| | | |
|---|---|---|
| JP | 60-32663 | 7/1985 |
| JP | 5-239392 | 9/1993 |
| JP | 5-255628 | 10/1993 |
| JP | 6-102378 | 12/1994 |
| JP | 6-340835 | 12/1994 |
| JP | 7-47355 | 5/1995 |
| JP | 10-88045 | 4/1998 |
| JP | 10-88056 | 4/1998 |
| JP | 10-305570 | 11/1998 |

* cited by examiner

*Primary Examiner*—Stephen Meier
*Assistant Examiner*—Ly T. Tran
(74) *Attorney, Agent, or Firm*—Morgan, Lewis & Bockius, LLP

(57) ABSTRACT

There are provided a recording liquid that produces high-quality images having a very high image density and water resistance without blotting or permeating into recording paper, and excels in discharging properties; and a method for recording images by the use of such a solution. The recording liquid for ink printers according to the present invention contains a colorant, water, and a fine particle of non-photo-curable resin and a fine particle of photo-curable resin. The method for recording images on a recording medium has the step of discharging the droplets of the recording liquid from a recording head, wherein the above recording liquid is used as the recording liquid.

4 Claims, No Drawings

RECORDING LIQUID FOR INK PRINTERS AND METHOD FOR RECORDING IMAGES

BACKGROUND OF THE INVENTION

1. Field of the Invention

The present invention relates to a recording liquid for ink printers and a method for recording images, and in particular relates to a recording liquid for ink printers.

2. Discussion of the Related Art

As an output device of low running costs and of easy color printing for information equipment such as computers, ink printer systems are attracting public attention. Such systems include an ink-jet system, which is a method of image recording for recording images on recording media such as paper by discharging droplets of a recording liquid from a head, or an acoustic ink printing system as disclosed in Japanese Patent Publication No. 6-102378 (1994). Heretofore, as a recording liquid for ink-jet printers, an aqueous solution of a dye mainly containing water and a dye has been used. However, such a solution has problems in that when the recording liquid discharged from the nozzle arrives at a recording paper, the solution bleeds on the recording paper and produces dots significantly larger than the droplets of the recording liquid formed when discharged from the nozzle, resulting in the low density of recorded images, and the low image quality. Also, since the water resistance of recorded images is low, images are easily blurred or flowed by water; and since the light resistance of recorded images is low, images are easily discolored by the irradiation of sunlight or the like.

In order to solve these problems of dye aqueous solutions, recording liquids for ink-jet printers that contain film forming resin particles have been disclosed. For example, a recording liquid containing latex as resin particles is disclosed in Japanese Patent Publication No. 60-32663 (1985); a recording liquid that contains a resin having carboxyl groups and nonionic hydrophilic groups dispersed in water is disclosed in Japanese Patent Laid-Open No. 5-239392 (1993); a recording liquid that contains vinyl polymers with a non-cross-linking structure is disclosed in Japanese Patent Laid-Open No. 5-255628 (1993); and a recording liquid that contains polyester particles having ionic groups is disclosed in Japanese Patent Laid-Open No. 6-340835 (1994). Also, a process of compounding fine particles of a resin such as polyester, and a cross-linking agent, and cross-linking the resin on a recording medium is disclosed in Japanese Patent Publication No. 7-47355 (1995); and a process that uses water-soluble dyes and ultraviolet rays is disclosed in Japanese Patent Laid-Open No. 10-305570 (1998). Furthermore, the inventors of the present invention disclosed a recording liquid that contains pigments and fine particles of two or more resins in Japanese Patent Laid-Open Nos. 10-88045 (1998) and 10-88056 (1998) and in U.S. patent application Ser. No. 08/925,391 that will be issued soon. (U.S. patent application Ser. No. 08/925,391 that will be issued soon)

However, any of the recording liquids disclosed in above-mentioned Japanese Patent Publication No. 60-32663 (1985), Japanese Patent Laid-Open Nos. 5-239392 (1993), 5-255628 (1993), and 6-340835 (1994), and Japanese Patent Publication No. 7-47355 (1995) starts to form a film of the fine particles of resins following evaporation of moisture in the recording liquid due to contact with air at the discharging nozzle of the recording head and clogs at the discharging nozzles so that it cannot be discharged from the nozzles stably. Also, the bleeding of the recording liquid due to the capillary action into the fibers of recording paper cannot be completely prevented, and high-quality images cannot be obtained. Furthermore, the permeation of the recording liquid into recording paper cannot be completely prevented, and these recording liquids have limitation in the formation of high-density, high-quality images. Similarly, there is limitation in water resistance. When the above-disclosed recording liquid is diluted by water to prevent clogging at a discharging nozzle, the content of resin particles contained in the same volume of the droplets of the recording liquid, that is, the resin solid content contributing to image formation, decreases, resulting in significant lowering of image density, and high-quality images cannot be obtained. By the use of the above-disclosed conventional recording liquids, an increase in image density to achieve high-quality images by increasing the content of resin particles is incompatible with the prevention of discharging nozzle clogging. Although a process that uses water-soluble ultraviolet-sensitive dyes, and radiates light (ultraviolet rays) onto the dyes to make them insoluble and fix them is disclosed in Japanese Patent Laid-Open No. 10-305570 (1998), the water resistance and light resistance of the images are not satisfactory because of the use of dyes. Furthermore, since light is irradiated onto colorants, i.e. dyes themselves, the color images are easily changed by aging due to natural exposure to sunlight or the like. Although an increase in image density to achieve high-quality images by increasing the content of resin particles (increase in resin solid content) is compatible with the prevention of discharging nozzle clogging by the use of recording liquids disclosed in Japanese Patent Laid-Open Nos. 10-88045 (1998) and 10-88056 (1998), the stability of discharging must be improved when a large number of sheets are printed using a practically used ink printer.

The present invention has been made in view of the above circumstances and provides a recording liquid for ink printers that can obtain water-resistant high-quality images with high image density, and may not bleed on nor permeate into recording paper, and can be discharged continuously and stably almost without nozzle clogging. The present invention also provides a method for recording images by the use of such a recording liquid.

SUMMARY OF THE INVENTION

The recording liquid that achieves the above and other aspects contains a colorant, water, a fine particle of non-photo-curable resin, and a fine particle of photo-curable resins.

Also, the present invention is characterized in that the above-described recording liquid is used in the method for recording images by discharging the droplets of the recording liquid from a recording head to record images on recording media. In this method for image recording, plain paper can be used as a recording medium.

According to the present invention, the achievement of high-density images can be compatible with the prevention of clogging discharging nozzles or apertures, by containing at least two resins, fine particles of non-photo-curable resin (s) and photo-curable resin(s) in the recording liquid.

This would be achieved for the following reasons. Since a light-curable resin does not cure unless it is irradiated by light, film formation at the nozzles of the recording head caused by curing reactions will not occur if the irradiation of the nozzles is prevented. Therefore, the occurrence of clogging is inhibited. If all the resins in the recording liquid are such photo-curable resins, a great deal of light energy and curing time is required for forming films on paper, and thus forming images. However, since both photo-curable resins and non-photo-curable resins are used in the present invention, the prevention of clogging at the discharging nozzles of the recording head can be compatible with the rapid formation of images.

These photo-curable resins may be either water-soluble resins or aqueous emulsion. In a case of aqueous emulsion the resin is present in the recording liquid in the form of fine particles of resin. If the recording liquid contains the fine particles of two or more different resins, the probability that the fine particles of the same type of resins are present around a certain type of resin particles (the nearest coordinating site) decreases. By this the probability of approaching and collision of the particles of the same type of resins with each other decreases, and a series of processes from the approaching to collision, fusion, and to film formation are inhibited (coordination effect), thereby clogging is prevented. Also, since inter-particle attraction is more difficult to act when the fine particles of different types of resins are present in the recording liquid than the fine particles of the same type of resins are present (repulsive force is easier to act), the approaching of resin particles is prevented, and the probability of collision between resin particles decreases (the inter-particle repulsive force effect), thereby a series of processes from the approaching to collision, fusion, and to film formation are inhibited, and clogging is prevented as in the above-described case. Furthermore, it is considered that the difference in diameters and shapes of particles between the fine particles of different resins is larger than the difference in diameters and shapes of particles between the fine particles of the same type of resins. When different types of resin particle having different diameters and shapes are present around a certain resin particle, the approaching of the same or different types of resin particles are more difficult than when only resin particles of almost the same diameter and shape are present (the geometrical structure effect), and clogging is prevented similarly to the above. Since the approaching of resin particles to each other is greatly inhibited by the total effect of the above, the total content of resin particles contained in the recording liquid can be increased, and the content of resin particles in a droplet can in turn be increased, enabling images of high image density to be formed.

When the photo-curable resin is water-soluble, the resin dissolves in the recording liquid, and if the content of this resin is made the same as the resin content in the recording liquid when the photo-curable resin is in an aqueous emulsion, the dissolved photo-curable resin can decrease the number of resin particles contained in the recording liquid while maintaining high density of the images, lowers the probability of collision, and prevents clogging even by one type of resin. Also, since the fine particles of the dissolved photo-curable resin enter between the fine particles of the non-photo-curable resin, preventing the approaching of resin particles, clogging can be prevented. It is preferred that the fine resin particles contain two or more types of resins.

Furthermore, any colorants can be used such as pigments and dyes. However, pigments are more advantageous in light resistance because absorbed light energy can be relieved by crystal-lattice oscillation.

By the total effect of the above elements, the bleeding or permeation of the recording liquid can be prevented, and images of high image density and high water resistance composed of resins and colorants encapsulated in the resin can be formed on recording media such as paper.

DETAILED DESCRIPTION OF THE PREFERRED EMBODIMENT

The present invention will be described in further detail below.

The recording liquid according to the present invention contains colorants, water, and fine particles of non-photo-curable resins and photo-curable resins.

The fine particles of resins used herein mean fine particles of resins as dispersoids which is generally known as an emulsion. The aqueous dispersion of the fine particles of resins generally have two phases of the fine particles of resins (dispersoids) and water (dispersion medium).

Non-photo-curable resins mean resins that have no mechanisms in their structures to start or promote the curing reaction caused by the irradiation of ultraviolet rays, visible lights, electron beams, and the like. Photo-curable resins mean resins that have mechanisms to start or promote the curing reaction caused by the irradiation of light (including electromagnetic waves), such as electron beams. Since it is mechanically easy to provide the printer with a radiation source, the photo-curable resins are preferably ultraviolet-curable resins or visible-light-curable resins.

The fine particles of the non-photo-curable resins in the aqueous dispersion used in the present invention include fine particles of a self-cross-linking resin, fine particles of a non-self-cross-linking resin that is cross-linked by the action of a cross-linking agent, and fine particles of a non-cross-linking resin. The fine particles of a self-cross-linking resin include fine particles of an acrylic-silicone-based resin, fine particles of an acrylic-amide-based resin, and the like, of which fine particles of an acrylic-silicone-based resin that contains alkoxysilyl groups are preferred from the point of view of quick film formation suitable for quick image formation and the strength of the formed film, because they can quickly form a rigid siloxane cross-linked film that envelopes colorants. The alkyl in the alkoxysilyl groups in the fine particles of the acrylic-silicone-based resin that contains alkoxysilyl groups is an alkyl having preferably one to three carbon atoms, more preferably one or two carbon atoms. The acrylic skeletons include polymers or copolymers that contain, for example, styrene, vinyl-toluene, methyl methacrylate, ethyl methacrylate, n-butyl methacrylate, iso-butyl methacrylate, 2-ethylhexyl methacrylate, vinyl acetate, acrylonitrile, methyl acrylate, ethyl acrylate, n-butyl acrylate, 2-ethylhexyl acrylate, methacrylic acid, acrylic acid, 2-hydroxyethyl methacrylate, hydroxypropyl methacrylate, 2-hydroxyethyl acrylate, acrylic amide, N-methylol acrylic amide, or glycidyl methacrylate as the monomer.

The fine particles of a non-cross-linking resin and the fine particles of a non-self-cross-linking resin include fine particles of a fluororesin, fine particles of an acrylic resin, fine particles of a polyester resin, fine particles of a vinyl acetate resin, fine particles of a vinyl chloride resin, fine particles of a styrene-butadiene copolymer resin, fine particles of a polyurethane resin, fine particles of a polystyrene resin, fine particles of a vinyl acetate-acrylic copolymer resin, fine particles of a vinyl acetate-acrylic amide copolymer resin, fine particles of an ethylene-vinyl acetate copolymer resin, fine particles of an epoxy resin, fine particles of a polyamide resin, or fine particles of a silicone resin. As the fine particles of a fluororesin among the above, the fine particles of a fluororesin that has fluoro-olefine units is particularly useful. More specifically, the fine particles of a fluorine-containing vinyl ether resin composed of fluoro-olefine units and vinyl ether units can be used effectively. The fluoro-olefine unit used herein is a moiety selected from —$CF_2CF_2$—, —$CF_2CF(CF_3)$—, and —$CF_2CFCl$—. The vinyl ether units include —$CH_2CH(OCH_3)$—, —$CH_2CH(OC_2H_5)$—, —$CH_2CH(OC_3H_7)$—, —$CH_2CH(OC_4H_9)$—, —$CH_2CH(OC_5H_{11})$—, —$CH_2CH(OCH_2OH)$—, —$CH_2CH(OC_2H_4OH)$—, —$CH_2CH(OC_3H_6OH)$—, —$CH_2CH(OC_4H_8OH)$—, —$CH_2CH(OC_5H_{10}OH)$—, —$CH_2CH(OCH_2COOH)$—, —$CH_2CH(OC_2H_4COOH)$—, —$CH_2CH$ —(OC$_3$H$_6$COOH)—, —CH$_2$CH(OC$_4$H$_8$COOH)—, —CH$_2$CH(OC$_5$H$_{10}$COOH)—, —CHCH$_3$CH(OCH$_3$)—, —CHCH$_3$CH(OC$_2$H$_5$)—, —CHCH$_3$CH(OC$_3$H$_7$)—, —CHCH$_3$CH(OC$_4$H$_9$)—, —CHCH$_3$CH(OC$_5$H$_{11}$)—, —CHCH$_3$CH(OCH$_2$OH)—, —CHCH$_3$CH(OC$_2$H$_4$OH)—, —CHCH$_3$CH(OC$_3$H$_6$OH)—, —CHCH$_3$CH(OC$_4$H$_8$OH)—, —CHCH$_3$CH(OC$_5$H$_{10}$OH)—, —CHCH$_3$CH(OCH$_2$COOH)—, —CHCH$_3$CH(OC$_2$H$_4$COOH)—, —CHCH$_3$CH(OC$_3$H$_6$COOH)—, —CHCH$_3$CH(OC$_4$H$_8$COOH)—, —CHCH$_3$CH(OC$_5$H$_{10}$COOH)—, and the like.

As the type of copolymers, an alternate copolymer in which fluoro-olefine units and vinyl ether units are completely alternately combined is preferred.

Although the fine particles of non-photo-curable resins contained in the recording liquid of the present invention may be of one type or the combination of two or more resins, the combination of two or more resins is preferable, and the combination of three or more resins is more preferable. Although there is no upper limit in the number of types of resins contained in the recording liquid, if each resin particle is assumed to have the same shape and size, and is assumed to be spherical, the number of particles equidistantly present around a certain particle when the particles are most closely packed, known as the number of closest particles (coordination number), that is the number of particles present in contact with a certain particle is 12. Therefore, the optimal upper limit of the types of resins in the resin particles is considered to be 12. Furthermore, considering the width of probable oscillation, the upper limit of the types of resins in the resin particles is preferably 18 (12 plus 6). Therefore, the total number is preferably 2 or more and 18 or less, more preferably 3 or more and 12 or less from the point of view of the reduction of probability of approaching and collision between the same type of resin particles due to the coordination effect. The clogging prevention effect becomes more significant when three or more types of resins are used. In the present invention, even if the monomer that constitutes the resin is the same, resins that impart different properties of the dispersion of resin particles due to difference in the way of modification or the like, i.e. at least one of the lowest film forming temperature, glass transition point, ionicity, pH, of weight average molecular weight, may be considered to be of different types.

Although the fine particles of any two or more non-photo-curable resins may be combined, it is preferable that the resin particles contain at least one self-cross-linking resin. It is further preferable that the resin particles contain a combination of fine particles of self-cross-linking resin(s) and non-cross-linking resin(s), from the point of view of producing timewise and structural difference in a process for film formation by each resin to make film forming difficult, thereby preventing clogging, that is, film formation at the discharging portion of the recording head.

When the recording liquid contains two types of fine particles of non-photo-curable resins that contain fine particles of self-cross-linking resin, the content of the fine particles of the self-cross-inking resin in the non-photo-curable resins is preferably in the range between 90 and 5% by weight. Furthermore, when the recording liquid contains n (n: an integer of 3 or more) types or more of the fine particles of non-photo-curable resins, the proportion of the fine particles of each resin contained in the non-photo-curable resins is preferably within the range between 2/n and 0.1/n % by weight, and more preferably within the range between 2/n and 0.4/n % by weight particularly for the fine particles of the self-cross-linking resin, although it can be suitably selected to realize desired properties to the largest extent.

The average particle diameter of each resin particle used in the present invention is preferably 0.01 μm or more and 5 μm or less, more preferably 0.05 μm or more and 3 μm or less. If the average particle diameter of each resin particle is less than 0.01 μm, film-forming properties become poor, and if the average particle diameter of each resin particle is more than 5 μm, the optical density (image density) will lower.

Photo-curable resins contained in the recording liquid of the present invention may be ultraviolet-curable resins or visible-light-curable resins. Specifically these resins include water-soluble resins and aqueous emulsions. The water-soluble resins include urethane-acrylate-based resins having alkali metal sulfonate groups, urethane-acrylate-based resins having organic amine carbonate groups, epoxy acrylate-based resins containing carboxyl groups, epoxy (meth) acrylate-based resins having quaternary ammonium salt groups, and polyoxymethylene acrylate/hydrophilic vinyl monomer-based resins. Aqueous emulsions include polyurethane-based resins containing photo-polymerizing acrylate groups on side chains, unsaturated resins containing self-emulsifying carboxyl groups naturally emulsified without using an emulsifier, and forced-emulsifying (meth)acrylate copolymer-based resins emulsified using an emulsifier.

These water-soluble resins and aqueous emulsions may be used separately or may be used together.

In the present invention, the total solid content of fine particles of the non-photo-curable resin and the photo-curable resin, for obtaining satisfactory optical density of the image and discharging stability is preferably within the range between 5 and 95% by weight, more preferably within the range between 15 and 90% by weight, further preferably within the range between 20 and 80% by weight, relative to the total quantity of the recording liquid.

Furthermore, the content of the photo-curable resin relative to the total weight of the non-photo-curable resin and the photo-curable resin is preferably 10–90% by weight, more preferably 20–80% by weight.

Any colorants can be used in the present invention as long as they have good affinity to water which is the main solvent, and can be dispersed evenly. Specifically, pigments, water-soluble dyes, or dispersed dyes can be used.

Pigments that can be used in the present invention include organic pigments, inorganic pigments, and the like. For example, carbon black (C.I. Pigment Black 7) such as furnace black and channel black, or organic pigment such as aniline black (C.I. Pigment Black 1) can be used for black-and-white applications. Pigments for color applications include C.I. Pigment Yellow 1, 3, 12, 13, 14, 17, 24, 34, 35, 37, 42, 53, 55, 81, 83, 95, 97, 98, 100, 101, 104, 108, 109, 110, 117, 120, 138, and 153, C.I. Pigment Violet 1, 3, 5:1, 16, 19, 23, and 38, C.I. Pigment Blue 1, 2, 15, 15:1, 15:2, 15:3, 15:4, 15:6, and 16. The content of pigments contained in the recording liquid is preferably 1–50% by weight, more preferably 1.5–40% by weight. In order to disperse these pigments in water, ultrasonic waves or a ball mill may be used case by case for dispersing. In addition, the pigments may be added to the recording liquid in the form of aqueous pigment dispersion.

The water-soluble dyes that can be used in the present invention include direct dyes and acid dyes. For example, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199; C.I. Direct Violet 7, 9, 47, 48, 51, 66, 90, 93, 94, 95, 98, 100, and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 144, 161, and 163; C.I. Direct Blue 1, 10, 15, 22, 25, 55, 67, 68, 71, 76, 77, 78, 80, 84, 86, 87, 90, 98, 106, 201, 202, 244, 251, and 280; C.I. Acid Black 7, 24, 29, and 48; C.I. Acid Violet 5, 34, 43, 47, 48, 90, and 103; C.I. Acid Yellow 17, 19, 23, 25, 39, 40, 44, 49, 50, 61, 110, 174, and 218; and C.I. Acid Blue 9, 25, 40, 41, 62, 72, 76, 80, 106, 112, 120, 205, 230, 271, and 280 are included, but the water-soluble dyes are not limited to these dyes. The content of these dyes contained in the recording liquid is determined depending on the type of the dye, the type of solvent components, or properties required for the recording liquid, and is generally 0.2–45% by weight, preferably 0.5–30% by weight. Dyes may be added in the recording liquid in the form of an aqueous solution.

Water used in the present invention is preferably ion-exchanged water, ultra-pure water, distilled water, ultra-filtered water, and the like.

In addition to the above, a pH-adjusting agent such as potassium dihydrogen phosphate and sodium dihydrogen phosphate, or a fungicide, an antiseptic agent, or anticorrosive agent such as benzoic acid, dichlophene, hexachlorophene, and sorbic acid may be added to the recording liquid as required.

Furthermore, various common additives such as a moistening agent, e.g. diethylene glycol, ethylene glycol and glycerin may be added to the recording liquid as required.

The recording liquid of the present invention can be used in a method for image recording that records images on a recording medium such as paper (e.g. plain paper) by discharging the droplets of the recording liquid from a head. In this method of image recording, it is preferable that the recording medium is irradiated by light such as ultraviolet rays and visible light. In this time, the recording head (or the aperture) must not be irradiated.

Also the recording liquid of the present invention can be used suitably not only in ink printers such as ink-jet printers and acoustic ink printers, but also in image recording by the electrostatic suction system.

The present invention will be described below based on the preferred embodiments.

EXAMPLE 1

A recording liquid was prepared by mixing evenly while stirring 35 parts by weight of an aqueous dispersion of dimethylquinacridone pigment (Pigment Red-122) (solid content: 31%, Dainichiseika Color & Chemicals Mfg. Co., Ltd., trade name: EP-1000); 27 parts by weight of an aqueous dispersion containing water and fine particles of acrylic silicone resin (average particle diameter: 0.1–0.2 µm) having methoxysilyl groups (solid content: 31%, Sanyo Chemical Industries, Ltd., trade name: SW-131); 17 parts by weight of a resin dispersion containing water and the fine particles of a fluorine-containing vinyl ether-based resin (average particle diameter: 0.15 µm) prepared by the emulsion polymerization of fluoro-olefine and vinyl ether (solid content: 50%, Asahi Glass Co., LTD., trade name: FE-3000); and 21 parts by weight of an aqueous emulsion of an ultraviolet-curable urethane acrylate-based resin (solid content: 40%, from Taisei Kako Co., Ltd., tradename: WBR-829). This mixture was filtered by a membrane filter with a pore diameter of 10 µm to remove coarse particles, to obtain a recording liquid of a pigment (colorant) content in the recording liquid (solid content of pigments×100/total quantity of the recording liquid) of 11% by weight, a pigment (colorant) content in the solid component (solid content of pigments×100/(solid content of pigments+solid content of resin particles)) of 30% by weight, and a total solid content of resin particles in the recording liquid (total solid content of resin particles×100/total quantity of the recording liquid) of 25% by weight.

The recording liquid thus prepared was applied to plain paper for copying machines by the use of a bar coater and dried at room temperature, to form a solid image on the plain paper. The optical density of the obtained image was measured from the surface side on which the image had been formed. As a result, the optical density of the solid image produced by the application of a quantity of the recording liquid as small as 0.9 mg per 1 $cm^2$ of the image area was as high as 1.6. The observation of the vertical cross-section of this solid image on the plain paper with an optical microscope revealed that the solid image was mainly formed on the surface of the plain paper, and practically no recording liquid permeated into the plain paper.

On the other hand, the clogging of the discharging nozzles of the recording head by the recording liquid was evaluated as follows. A standard injection needle of an inner diameter of 420 µm (from Iwashita Engineering Co., Ltd.) was set on the tip of a syringe of an inner diameter of 15 mm, and 10 ml of the recording liquid was sucked in this syringe. Next, the upper portion of the syringe was sealed to stop the recording liquid dropping from the syringe and allowed the syringe to stand. After a specified time has passed, the upper portion was opened, and whether the recording liquid could drop continuously from the needle was checked. This operation was repeated by gradually increasing the time, and the longest time when the recording liquid could drop from the needle was recorded as the time until the occurrence of clogging. The thus measured time until the occurrence of clogging by the recording liquid by this method was as long as 240 seconds.

Next, a printing test of this recording liquid on plain paper was carried out using a commercially available ink-jet printer. As a result, the stock solution of this recording liquid could be discharged stably. By the observation of thus printed dots using a magnifier and an optical microscope, slight blotting was found around the dots, but it did not arise problems in practical uses.

Next, the printing test of this recording liquid on plain paper was carried out using an ultraviolet lamp mounted on a commercially available ink-jet printer, while radiating ultraviolet rays of an intensity of 100 $mJ/cm^2$ onto the surface of paper. As a result, the stock solution of this recording liquid could be discharged stably. By the observation of thus printed dots using a magnifier and an optical microscope, clear dots without blotting around the dots was found.

Furthermore, the water resistance was evaluated by spilling water on the solid image formed with the above bar coater and the print sample formed with the printer. The result showed that there were no blotting of the image or spreading of the colorants caused by water, and that the recording liquid of the present invention has a high water resistance.

EXAMPLE 2

Another recording liquid was prepared by mixing evenly while stirring 29 parts by weight of an aqueous dispersion of copper-phthalocyanine pigment (Pigment Blue 15:3) (solid content: 35%, from Dainichiseika Color & Chemicals Mfg. Co., Ltd., trade name: EP-700); 25 parts by weight of a resin dispersion containing water and fine particles of acrylic silicone resin having methoxysilyl groups (average particle diameter: 0.1–0.2 µm) (solid content: 31%, from Sanyo Chemical Industries, Ltd., trade name: SW-131); 26 parts by weight of a resin dispersion containing water and fine particles of a modified polyester resin having carboxyl groups added on the side chains (average particle diameter: 0.1–0.2 µm) (solid content: 30%, from Takamatsu Oil and Fat Co., LTD., trade name: A-215G); and 20 parts by weight of an aqueous emulsion of an ultraviolet-curable urethane acrylate-based resin (solid content: 40%, Taisei Kako Co., Ltd., trade name: WBR-829). This mixture was filtered by a membrane filter with a pore diameter of 10 µm to remove coarse particles, to obtain a recording liquid of a pigment (colorant) content in the recording liquid of 10% by weight, a pigment (colorant) content in the solid component of 30% by weight, and a total solid content of resin particles in the recording liquid of 24% by weight.

The recording liquid thus prepared was applied to plain paper for copying machines by the use of a bar coater and dried at room temperature, to form a solid image on the plain paper. The optical density of the obtained image was measured from the surface side on which the image had been formed. As a result, the optical density of the solid image produced by the application of a quantity of the recording liquid as small as 0.9 mg per 1 $cm^2$ of the image area was as high as 1.5. The observation of the vertical cross-section of this solid image on the plain paper with an optical microscope revealed that the solid image was mainly formed on the surface of the plain paper, and practically no recording liquid permeated into the plain paper.

Next, the clogging of the discharging nozzles of the recording head by the recording liquid was evaluated by the same way as in Example 1. The thus measured time until the occurrence of clogging by the recording liquid by this method was as long as 250 seconds.

Furthermore, a printing test of this recording liquid on plain paper was carried out using a commercially available ink-jet printer. As a result, the stock solution of this recording liquid could be discharged stably. By the observation of thus printed dots using a magnifier and an optical microscope, slight blotting was found around the dots, but it did not arise problems in practical uses.

Next, the printing test of this recording liquid on plain paper was carried out using an ultraviolet lamp mounted on a commercially available ink-jet printer, while radiating ultraviolet rays of an intensity of 100 mJ/$cm^2$ onto the surface of paper. As a result, the stock solution of this recording liquid could be discharged stably. By the observation of thus printed dots using a magnifier and an optical microscope, clear dots without blotting around the dots was found.

Next, the water resistance was evaluated by spilling water on the solid image formed with the above bar coater and the print sample formed with the printer. The result showed that there were no blotting of the image or spreading of the colorants caused by water, and that the recording liquid of the present invention has a high water resistance.

EXAMPLE 3

Another recording liquid was prepared by mixing evenly while stirring 34 parts by weight of an aqueous dispersion of disazo-pigment (Pigment Yellow 12) (solid content: 33%, from Dainichiseika Color & Chemicals Mfg. Co., Ltd., trade name: EP-500); 9 parts by weight of a resin dispersion containing water and fine particles of acrylic silicone resin having methoxysilyl groups (average particle diameter: 0.1–0.2 µm) (solid content: 31%, from Sanyo Chemical Industries, Ltd., trade name: SW-131); 5 parts by weight of a resin dispersion containing water and fine particles of a fluorine-containing vinyl ether-based resin (average particle diameter: 0.15 µm) prepared by the emulsion polymerization of fluoro-olefine and vinyl ether (solid content: 50%, from Asahi Glass Co., LTD., trade name: FE-3000); 6 parts by weight of a resin dispersion containing water and fine particles of a modified styrene-butadiene copolymer (average particle diameter: 0.19 µm) (solid content: 45%, from Sumika ABS Latex, trade name: SN-335); and 46 parts by weight of an aqueous emulsion of an ultraviolet-curable urethane acrylate-based resin (solid content: 40%, from Taisei Kako Co., Ltd., trade name: WBR-829). This mixture was filtered by a membrane filter with a pore diameter of 10 µm to remove coarse particles, to obtain a recording liquid of a pigment (colorant) content in the recording liquid of 11% by weight, a pigment (colorant) content in the solid component of 30% by weight, and a total solid content of resin particles in the recording liquid of 26% by weight.

The recording liquid containing a large proportion of photo-curable resins thus prepared was applied to plain paper for copying machines by the use of a bar coater and dried at room temperature, to form a solid image on the plain paper. The optical density of the obtained image was measured from the surface side on which the image had been formed. As a result, the optical density of the solid image produced by the application of a quantity of the recording liquid as small as 0.9 mg per 1 $cm^2$ of the image area was as high as 1.4. The observation of the vertical cross-section of this solid image on the plain paper with an optical microscope revealed that the solid image was mainly formed on the surface of the plain paper, and practically no recording liquid permeated into the plain paper.

Next, the clogging of the discharging nozzles of the recording head by the recording liquid was evaluated by the same way as in Example 1. The thus measured time until the occurrence of clogging by the recording liquid by this method was as long as 320 seconds.

Furthermore, a printing test of this recording liquid on plain paper was carried out using a commercially available ink-jet printer. As a result, the stock solution of this recording liquid could be discharged stably. By the observation of thus printed dots using a magnifier and an optical microscope, slight blotting was found around the dots, but it did not arise problems in practical uses.

Next, the printing test of this recording liquid on plain paper was carried out using an ultraviolet lamp mounted on a commercially available ink-jet printer, while radiating ultraviolet rays of an intensity of 100 mJ/$cm^2$ onto the surface of paper. As a result, the stock solution of this recording liquid could be discharged stably. By the observation of thus printed dots using a magnifier and an optical microscope, clear dots without blotting around the dots was found.

Next, the water resistance was evaluated by spilling water on the solid image formed with the above bar coater and the print sample formed with the printer. The result showed that there were no blotting of the image or spreading of the colorants caused by water, and that the recording liquid of the present invention has a high water resistance.

EXAMPLE 4

Another recording liquid was prepared by mixing evenly while stirring 27 parts by weight of an aqueous dispersion of copper-phthalocyanine pigment (Pigment Blue 15:3) (solid content: 35%, from Dainichiseika Color & Chemicals Mfg. Co., Ltd., trade name: EP-700); 18 parts by weight of a resin dispersion containing water and fine particles of acrylic silicone resin having methoxysilyl groups (average particle diameter: 0.1–0.2 µm) (solid content: 31%, from Sanyo Chemical Industries, Ltd., trade name: SW-131); 19 parts by weight of a resin dispersion containing water and fine particles of a modified polyester resin (average particle diameter: 0.1–0.2 µm) having carboxyl groups added on the side chains (solid content: 30%, from Takamatsu Oil and Fat Co., LTD., trade name: A-215G); 14 parts by weight of an aqueous emulsion of an ultraviolet-curable urethane acrylate-based resin (solid content: 40%, Taisei Kako Co., Ltd., trade name: WBR-829); and 22 parts by weight of an aqueous solution of a polyoxymethylene acrylate/hydrophilic vinyl monomer-based water soluble resin (from Adel Company, trade name: K-40) (solid content: 25%). This mixture was filtered by a membrane filter with a pore diameter of 10 µm to remove coarse particles, to obtain a recording liquid of a pigment (colorant) content in the recording liquid of 9% by weight, a pigment (colorant) content in the solid component of 30% by weight, and a total solid content of resin particles in the recording liquid of 22% by weight.

The recording liquid thus prepared was applied to plain paper for copying machines by the use of a bar coater and dried at room temperature, to form a solid image on the plain paper. The optical density of the obtained image was measured from the surface side on which the image had been formed. As a result, the optical density of the solid image produced by the application of a quantity of the recording liquid as small as 0.9 mg per 1 $cm^2$ of the image area was as high as 1.4. The observation of the vertical cross-section of this solid image on the plain paper with an optical microscope revealed that the solid image was mainly formed on the surface of the plain paper, and practically no recording liquid permeated into the plain paper.

Next, the clogging of the discharging nozzles of the recording head by the recording liquid was evaluated by the same way as in Example 1. The thus measured time until the occurrence of clogging by the recording liquid by this method was as long as 260 seconds.

Furthermore, a printing test of this recording liquid on plain paper was carried out using a commercially available ink-jet printer. As a result, the stock solution of this recording liquid could be discharged stably. By the observation of thus printed dots using a magnifier and an optical microscope, slight blotting was found around the dots, but it did not arise problems in practical uses.

Next, the printing test of this recording liquid on plain paper was carried out using an ultraviolet lamp mounted on a commercially available ink-jet printer, while radiating ultraviolet rays of an intensity of 100 $mJ/cm^2$ onto the surface of paper. As a result, the stock solution of this recording liquid could be discharged stable. By the observation of thus printed dots using a magnifier and an optical microscope, clear dots without blotting around the dots was found.

Next, the water resistance was evaluated by spilling water on the solid image formed with the above bar coater and the print sample formed with the printer. The result showed that there were no blotting of the image or spreading of the colorants caused by water, and that the recording liquid of the present invention has a high water resistance.

COMPARATIVE EXAMPLE 1

A recording liquid was prepared in the same way as in Example 1 except adding no photo-curable resins, by mixing evenly while stirring 34 parts by weight of an aqueous dispersion of dimethylquinacridone pigment (Pigment Red-122) (solid content: 31%, from Dainichiseika Color & Chemicals Mfg. Co., Ltd., trade name: EP-1000); 40 parts by weight of a resin dispersion containing water and fine particles of acrylic silicone resin having methoxysilyl groups (average particle diameter: 0.1–0.2 µm) (solid content: 31%, Sanyo Chemical Industries, Ltd., trade name: SW-131); and 25 parts by weight of a resin dispersion containing water and fine particles of a fluorine-containing vinyl ether-based resin (average particle diameter: 0.15 µm) prepared by the emulsion polymerization of fluoro-olefine and vinyl copolymers (solid content: 50%, from Asahi Glass Co., LTD., trade name: FE-3000). This mixture was filtered by a membrane filter with a pore diameter of 10 µm to remove coarse particles, to obtain a recording liquid of a pigment (colorant) content in the recording liquid of 11% by weight, a pigment (colorant) content in the solid component of 30% by weight, and a total solid content of resin particles in the recording liquid of 25% by weight.

For the recording liquid thus prepared, the optical density and time until clogging occurred were measured, and the printing test on plain paper using a commercially available ink-jet printer was carried out in the same way as in Example 1. As a result, the optical density of the solid image produced by the application of a quantity of the recording liquid as small as 0.9 mg per 1 $cm^2$ of the image area was 1.7. However, the time until clogging occurred was as short as 80 seconds. As a result of the printing test using a commercially available ink-jet printer, printing was feasible in the initial stage, but with increase in the number of printing, the partial blur of printed characters was found.

COMPARATIVE EXAMPLE 2

Another recording liquid was prepared in the same way as in Example 2 except adding no photo-curable resins, by mixing evenly while stirring 27 parts by weight of an aqueous dispersion of copper-phthalocyanine pigment (Pigment Blue 15:3) (solid content: 35%, from Dainichiseika Color & Chemicals Mfg. Co., Ltd., trade name: EP-700); 36 parts by weight of a resin dispersion containing water and fine particles of acrylic silicone resin having methoxysilyl groups (average particle diameter: 0.1–0.2 µm) (solid content: 31%, from Sanyo Chemical Industries, Ltd., trade name: SW-131); and 37 parts by weight of a resin dispersion containing water and fine particles of a modified polyester resin (average particle diameter: 0.1–0.2 µm) having carboxyl groups added on the side chains (solid content: 30%, from Takamatsu Oil and Fat Co., LTD., trade name: A-215G). This mixture was filtered by a membrane filter with a pore diameter of 10 µm to remove coarse particles, to obtain a recording liquid of a pigment (colorant) content in the recording liquid of 9% by weight, a pigment (colorant) content in the solid component of 30% by weight, and a total solid content of resin particles in the recording liquid of 22% by weight.

For the recording liquid thus prepared, the optical density and time until clogging occurred were measured, and the printing test on plain paper using a commercially available ink-jet printer was carried out in the same way as in Example 2. As a result, the optical density of the solid image produced by the application of a quantity of the recording liquid as small as 0.9 mg per 1 $cm^2$ of the image area was 1.7. However, the time until clogging occurred was as short as 90 seconds. As a result of the printing test using a commercially available ink-jet printer, printing was feasible in the initial stage, but with increase in the number of printing, the partial blur of printed characters was found.

COMPARATIVE EXAMPLE 3

Another recording liquid was prepared in the same way as in Example 3 except adding no photo-curable resins, by mixing evenly while stirring 34 parts by weight of an aqueous dispersion of disazo-pigment (Pigment Yellow 12) (solid content: 33%, from Dainichiseika Color & Chemicals Mfg. Co., Ltd., trade name: EP-500); 28 parts by weight of a resin dispersion containing water and fine particles of acrylic silicone resin having methoxysilyl groups (average particle diameter: 0.1–0.2 μm) (solid content: 31%, from Sanyo Chemical Industries, Ltd., trade name: SW-131); 17 parts by weight of a resin dispersion containing water and fine particles of a fluorine-containing vinyl ether-based resin (average particle diameter: 0.15 μm) prepared by the emulsion polymerization of fluoro-olefine and vinyl ether copolymer (solid content: 50%, from Asahi Glass Co., LTD., trade name: FE-3000); and 20 parts by weight of a resin dispersion containing water and fine particles of a modified styrene-butadiene copolymer (average particle diameter: 0.19 μm) (solid content: 45%, from Sumika ABS Latex, trade name: SN-335). This mixture was filtered by a membrane filter with a pore diameter of 10 μm to remove coarse particles, to obtain a recording liquid of a pigment (colorant) content in the recording liquid of 11% by weight, a pigment (colorant) content in the solid component of 30% by weight, and a total solid content of resin particles in the recording liquid of 27% by weight.

For the recording liquid thus prepared, the optical density and time until clogging occurred were measured, and the printing test on plain paper using a commercially available ink-jet printer was carried out in the same way as in Example 3. As a result, the optical density of the solid image produced by the application of a quantity of the recording liquid as small as 0.9 mg per 1 cm$^2$ of the image area was 1.7. However, the time until clogging occurred was as short as 130 seconds. As a result of the printing test using a commercially available ink-jet printer, printing was feasible in the initial stage, but with increase in the number of printing, the partial blur of printed characters was found.

COMPARATIVE EXAMPLE 4

Another recording liquid was prepared in the same way as in Example 1 except adding one more type of non-photo-curable resin in place of a photo-curable resin, by mixing evenly while stirring 36 parts by weight of an aqueous dispersion of dimethyl quinacridone-based pigment (Pigment Red-122) (solid content: 31%, from Dainichiseika Color & Chemicals Mfg. Co., Ltd., trade name: EP-1000); 28 parts by weight of a resin dispersion containing water and fine particles of acrylic silicone resin having methoxysilyl groups (average particle diameter: 0.1–0.2 μm) (solid content: 31%, from Sanyo Chemical Industries, Ltd., trade name: SW-131); 17 parts by weight of a resin dispersion containing water and fine particles of a fluorine-containing vinyl ether-based resin (average particle diameter: 0.15 μm) prepared by the emulsion polymerization of fluoro-olefine and vinyl ether (solid content: 50%, from Asahi Glass Co., LTD., trade name: FE-3000); and 19 parts by weight of a resin dispersion containing water and fine particles of a modified styrene-butadiene copolymer (average particle diameter: 0.19 μm) (solid content: 45%, from Sumika ABS Latex, trade name: SN-335). This mixture was filtered by a membrane filter with a pore diameter of 10 μm to remove coarse particles, to obtain a recording liquid of a pigment (colorant) content in the recording liquid of 11% by weight, a pigment (colorant) content in the solid component of 30% by weight, and a total solid content of resin particles in the recording liquid of 26% by weight.

For the recording liquid thus prepared, the optical density and time until clogging occurred were measured, and the printing test on plain paper using a commercially available ink-jet printer was carried out in the same way as in Example 1. As a result, the optical density of the solid image produced by the application of a quantity of the recording liquid as small as 0.9 mg per 1 cm$^2$ of the image area was 1.6. However, the time until clogging occurred was as short as 120 seconds. As a result of the printing test using a commercially available ink-jet printer, printing was feasible in the initial stage, but with increase in the number of printing, the partial blur of printed characters was found.

By the use of the recording liquids of Examples 1-4, as described above, the compatibility of high optical density with the prevention of clogging could be achieved, unlike Comparative Examples.

EFFECTS OF THE INVENTION

According to the present invention, there is provided a recording liquid that produces high-quality images having a very high image density and water resistance without blotting or permeation on recording paper, and that excels in discharging stability because the recording liquid contains colorants, water, fine particles of a non-photo-curable resin and a photo-curable resin. Also according to the present invention, a method for recording images that have the above-described advantages.

What is claimed is:

1. A recording liquid for ink printers, comprising:
   colorants;
   water; and
   fine particles of at least one photo-curable resin and at least three non-photo-curable resins,
wherein
at least one of the non-photo-curable resins is a self-cross-linking resin,
the total solids content of the resin particles is from about 20 to about 80% by weight and
the content of the photo-curable resin relative to the total weight of the non-photo-curable resin and the photo-curable resin is from about 10 to about 80%.

2. A method for recording images on a recording medium, comprising:
   discharging droplets of the recording liquid according to claim 1 from a recording head.

3. The recording liquid according to claim 1, wherein the at least one non-photo-curable, self-cross-linking resin is an acrylic-silicone containing resin.

4. The recording liquid according to claim 1, wherein one of the at least two non-photo-curable resins is a fluororesin.

* * * * *